United States Patent [19]

Vossen

[11] E Patent Number: Re. 32,817

[45] Reissued Date of Patent: Jan. 3, 1989

[54] SHEET PROCESSING APPARATUS

[75] Inventor: Franz Vossen, Radolfzell, Fed. Rep. of Germany

[73] Assignee: Meurer Nonfood Product GmbH, Radolfzell, Fed. Rep. of Germany

[21] Appl. No.: 100,934

[22] Filed: Sep. 24, 1987

Related U.S. Patent Documents

Reissue of:

[64] Patent No.: 4,544,367
Issued: Oct. 1, 1985
Appl. No.: 426,904
Filed: Sep. 29, 1982

[30] Foreign Application Priority Data

May 4, 1982 [DE] Fed. Rep. of Germany ..... 3216593

[51] Int. Cl.[4] ..... B31B 1/25

[52] U.S. Cl. ..... 493/1; 83/886; 493/65; 493/355

[58] Field of Search ..... 493/1, 2, 65, 160, 355, 493/396, 404; 83/471.2, 925 CC, 886, 887, 879, 881

[56] References Cited

U.S. PATENT DOCUMENTS

| | | | |
|---|---|---|---|
| 2,075,287 | 3/1937 | Jagusch | 493/396 X |
| 3,137,218 | 6/1964 | Elliott | 493/354 |
| 3,522,753 | 8/1970 | Schmied | 83/471.2 |
| 3,772,949 | 11/1973 | Pavone et al. | 83/471.2 X |
| 4,358,975 | 11/1982 | Higgins | 83/471.2 X |

*Primary Examiner*—James F. Coan
*Attorney, Agent, or Firm*—Bachman & LaPointe

[57] ABSTRACT

Apparatus for processing a sheet of material such as cardboard intended for making a folding box or case, comprises a stamping plate for carrying the sheet and co-operable with a tool. The stamping plate lies on a table plate of a frame structure which has holders for releasably carrying a form which extends parallel to the table plate, and at least one bridge assembly which extends movably above the table plate. A carriage is carried on the bridge assembly and moves transversely with respect to the direction of travel thereof. The carriage carries at least one vertically movable pressure member directed towards the table plate.

17 Claims, 3 Drawing Sheets

SHEET PROCESSING APPARATUS

Matter enclosed in heavy brackets [ ] appears in the original patent but forms no part of this reissue specification; matter printed in italics indicates the additions made by reissue.

BACKGROUND OF THE INVENTION

This invention relates generally to an apparatus for processing or operating on a sheet of material such as for sheets of cardboard for the manufacture of an article such as a folding box or case.

Sheets of material of the above-indicated kind are usually processed by means of sheet stamping or punching machines, into which a punching or stamping plate with a register or set-up sheet disposed thereon is introduced. The plate comes into contact with the stamping shaping tool or punching tool in the sheet stamping machine or automatic apparatus. In automatic punching or stamping apparatuses of that kind, before the actual production operation is performed, during a single stroke movement, lines of the blades and bending lines must be marked on the set-up sheet, and then die regions or zones are produced on the sheet, then being disposed opposite to the punching or stamping tool which represents a top die.

It is also known for the setting-up or register operation which is required for producing the die to be carried out by means of a device, referred to a nylo-print plate, which in turn can also be fixed only in the sheet stamping or punching machine itself.

In both of the situations referred to above, the operating time required for carrying out the initial setting-up operation is from 30 to 45 minutes, which is a very long period of time, indicating the extent to which that operation prevents the machine from being used in the actual processing procedure, with a corresponding detrimental effect on the economy of the machine and the expense of the article produced.

SUMMARY OF THE INVENTION

An object of the present invention is to provide an apparatus for operating on sheets of material such as sheets of cardboard, which does not suffer from the above-mentioned disadvantage.

Another object of the present invention is to provide such an apparatus which permits an operation of preparing the setting-up sheet to be carried out without reducing the machine operating times.

A further object of the present invention is to provide an apparatus for dealing with sheets of cardboard, which can be readily fitted to present punching machines as a subsequent auxiliary fitment.

Still another object of the present invention is to provide an apparatus for processing sheets of cardboard for the manufacture of folding boxes or cases or the like, which readily lends itself to computerised control.

Still a further object of the present invention is to provide an apparatus or producing sheets of cardboard intended for the manufacture of folding boxes or cases or the like, which can be readily adapted to varying sheet formats.

These and other objects are achieved by an apparatus in accordance with the present invention, comprising a stamping or punching plate for carrying the sheet of material to be processed, acting as a die for an associated punching or stamping tool, with a chase or form structure. The plate lies on a table plate member of a support frame structure which has lateral tool holders for releasably carrying the chase or form which extends parallel to the table plate member. The support frame structure also has at least one guide track assembly which extends over the table plate member at a spacing therefrom and which is mounted so as to be movable thereover. The guide track assembly carries a carriage or slider member which is movable transversely with respect to the direction of travel of the guide track assembly. The carriage or slider member is provided with at least one vertically movable pressing member which is directed towards the table plate member.

In accordance with a further preferable feature of the present invention, the pressure member is formed by a punch or ram or rod member of a pressure cylinder unit disposed at the underside of the carriage or slider member.

By virtue of the arrangement as outlined above, a stamping or punching plate which is for example to be repaired or set up for the actual manufacturing process can be held in position outside the sheet stamping machine, and the punching or stamping tool which is already ready for use can be associated therewith; the vertically movable pressing member is also movable in two horizontal co-ordinate directions, and that permits the arrangement to be adjusted with a very high degree of accuracy to an intended pressure location, that is to say, it is possible to produce impressions only where they are absolutely necessary for subsequently guiding a milling cutter or other cutter tool. It is no longer necessary for the entire punching or stamping tool to be pressed, as an upper or top die, against the hard cardboard plate, and that both results in lower pressure and also produces a lower degree of wear.

In accordance with the teaching of the present invention, it is also possible for the entire impressing operation to be controlled by computer means, so that individual impressing regions can be define before operation is commenced.

For the purposes of adapting the apparatus in accordance with the principles of this invention to the respective sheet format required, the table plate member carries at least one lateral bar or member which is arranged on the table plate member in such a way as to be movable, while being capable of being fixed in a steplessly adjusted position; the bar or jaw member is guided displaceably in a position such as to be parallel to one of two side frame portions or members of the support structure, which project upwardly beyond the table plate member. The bar or jaw member may possiby be guided by means of at least one guide spindle or shaft in a respective guide bore in the side frame portion or member.

As not only the format of the punching or stamping plate changes, but also the nature or configuration of the tool, it has been found desirable to provide adaptors for connecting the tool and the apparatus, wherein preferably one side frame portion or member carries the tool holder and the other side frame portion or member, or the bar member thereat, is provided with means for clamping the chase or form assembly in the desired position.

The guide track assembly for carrying the above-mentioned carriage is preferably provided by a shaped carrier member in the form of a bridge-like arrangement which is mounted at both sides by means of rollers or the like guide members on guide track portions provided by the side frame portions or members. The track portions may be formed for example by mutually facing grooves in which the rollers or like guide members are guided.

In order to ensure that the bridge assembly remains parallel to itself in its movement along the guide track portions, gears or toothed wheels provided thereon at both sides or ends thereof, engage into suitable control means such as detent means or racks forming the guide track portions The detent means or racks could be formed for example by the intermediate spaces of bicycle-chain-like fitments or fixtures on the support structure.

The apparatus in accordance with the present invention permits the manufacture, outside of the automatic production machinery, of the dies required therefor, of from 3b to 6 format, whereby in accordance with the present invention the so-called stops or abutments for the different chases or frames are interchangeable.

A further development in the apparatus in accordance with the principles of this invention is concerned with use thereof in operating on zones or portions of large surface area. For that purpose, the pressure member is in the form of a roller, the periphery of which defines strip-like impressing regions of a required width. In addition, the roller may be rotatably carried by an upwardly and downwardly movable support which may be a component of a stroke piston unit, and in that way may be as desired lifted up and pressed down against an article, for rolling the periphery of the roller thereagainst.

Further objects, features and advantages of the present invention will be apparent from the following description of the preferred embodiments and the claims, and the accompanying drawings.

DESCRIPTION OF THE PREFERRED EMBODIMENT

Figure 1:
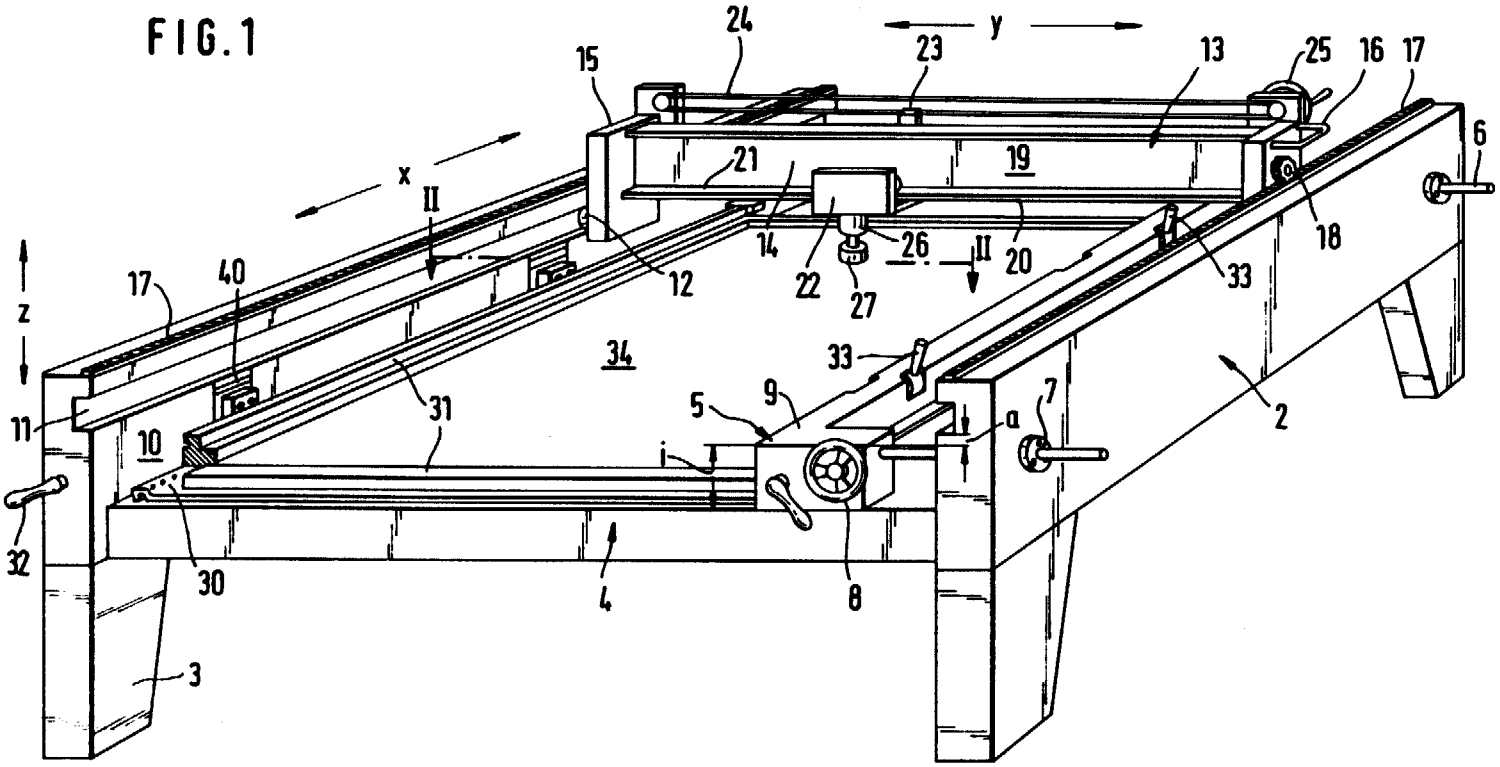
FIG. 1 shows a perspective view of an apparatus for processing sheets of cardboard for the manufacture of articles such as folding boxes or cases.

An apparatus 1 for processing or operating on a sheet of material such as a sheet or cardboard or like material for the manufacture for example of an article such as a folding box or case or the like has a table plate member 4 disposed between first and second side frame members or portions 2 which are of a yoke-like configuration, with support legs 3, thereby forming a support frame structure. Arranged above the table plate member 4 is at least one lateral defining member or format bar 5 which is of the height indicated at i in FIG. 1, the bar 5 being displaceable parallel to the side portions 2. For the purposes of displacing the bar 5 across the table plate member 4, the bar 5 is connected to guide or control spindles or shafts as indicated at 6 which pass through mounting bores 7 in the adjacent side portion 2, and has a hand wheel 8 which is rotatable for displacing the bar 5 across the table plate member 4 by actuation of the spindles 6. It will be seen therefore that for example the spindles are geared or ganged together so as to move the bar 5 with a uniform motion, in a parallel manner.

Reference numeral 9 in FIG. 1 denotes the top surface of the bar 5. Disposed at a spacing indicated by a above the level of the top surface 9 of the bar 5, in the substantially vertical, inwardly facing surfaces 10 of the two side portions 2, are horizontal guide grooves as indicated at 11, which therefore face towards each other in the manner clearly visible in FIG. 1. The guide grooves 11 carry rollers or like guide members as indicated at 12 which are carried on a moving bridge assembly 13 comprising an I-shaped carrier or beam member 14 and side plate assemblies 15 disposed at respective ends thereof. It will be seen therefore that the bridge assembly 13 is movable along the guide tracks formed by the grooves 11, on the rollers 12, in the direction indicated by double-headed arrow x in FIG. 1.

For the purposes of displacing the bridge assembly 13 along the side portions 2 in the direction indicated by the arrow x, the bridge assembly 13 has a handle 16. Carried on each side portion 2, on the top surface thereof as illustrated in FIG. 1, are guide control means such as detent means or rack means, illustrated in the form of elongate control members in the form substantially of a bicycle-type chain, as indicated at 17. Each end plate structure 15 of the bridge assembly 13 carries a gear or toothed wheel 18 which engages into respective ones of the members 17, to ensure that the bridge assembly 13 is guided parallel to itself, in the course of its movement along the guide tracks 11.

As can be seen from FIG. 1, the lower flange plate portion 20 of the I-beam carrier member 14 forms, on both sides of the central web portion 19 thereof, upwardly facing guide surfaces 21 for a carriage or slider member 22 which is movable along the carrier member 14 in the direction indicated by double-headed arrow y, by means of an elongate conveyor or actuating means illustrated in the form of a cable or chain loop 24 which engages a bar 23 on the carriage 22. The carriage 22 will thus be actuated when a control wheel 25 is turned to displace the cable or chain 24.

The carriage 22 carries a hydraulic piston cylinder unit 24, the piston of which faces downwardly and carries at its lower end a punch or ram head 27. The ram head 27 thus faces towards a stamping or punching plate 30 which is fixed on the table plate member 4. The plate 30 comprises steel and on its upper surface carries a hard cardboard plate 29 which is laid thereon, to act as a setting-up or register sheet. The height or thickness of the plate 29 is for example 0.6 mm. As shown in FIG. 1, a chase or form indicated generally at 31 rests on the plate 30 in the operating condition shown in FIG. 1. The chase 31 is movable vertically in the direction indicated by the double-headed arrow z by way of a gripping lever 32 mounted on the side portion 2, with a suitable operating assembly connected thereto, including lifting components (not shown) for vertically displacing the chase 31. The chase 31 can be fixed in a downward operative or pressing position by clamping levers 33, as indicated on the bar 5. The chase 31 therefore fixedly surrounds a form plate 34 as a punching or stamping form in which the folding box or case pattern is provided, therefore carrying blades 35 for subsequent cut lines 36 and punching or stamping members 3 for forming bend lines 38, as can be seen more clearly from FIGS. 2 and 3. Rubber buffer members are shown at 39 in FIGS. 2 and 3, on respective sides of the blades 35 and the punching or stamping members 37, to act as spacers for maintaining a given spacing between the underneath surface of the chase structure 31 and the upper surface of the plate 30.

Figure 2:
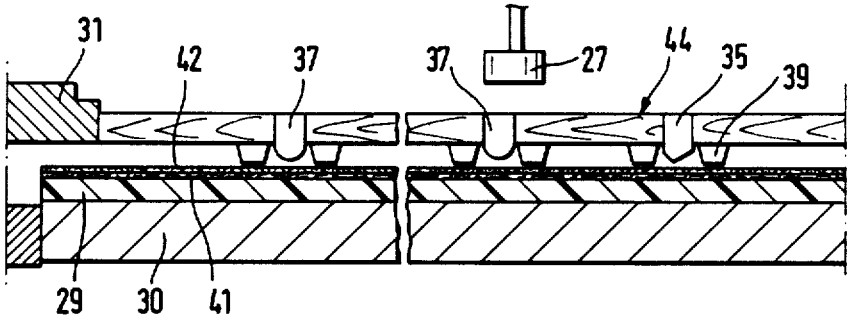
FIG. 2 shows a view on an enlarged scale and in exaggerated form of a part of the arrangement shown in FIG. 1, in cross-section taken along line II—II in FIG. 1.

When a plate 30 is fixed between the table plate member 4 and the chase 31 which is guided in tool holders 40, after adjustment of the setting-up or preparation format by suitable adjusting movement of the bar 5, and when the plate 30 has been covered by a layer or ply of tracing paper or the like as indicated at 41 in FIG. 2 and a blank sheet as shown at 42 in FIG. 2, the member 34 is fitted thereover in such a way that blades 35 and stamping members 37 thereof produce imprints or impressions on the sheet 29 by virtue of the paper 41.

Figure 3:
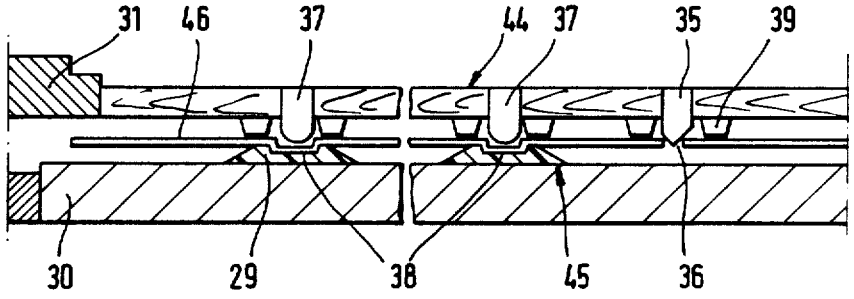
FIG. 3 shows a view corresponding to that shown in FIG. 2 with components of the arrangement in a different position.

The tool structure 44 comprising the chase 31 and the plate 34 can now be removed and transferred into an associated sheet punching or stamping machine (not shown in the drawing) with correspondingly positioned tool holders, and the sheet 29 can be processed to form the die. The locations for the bend lines 38 which, by virtue of the ram head 27, may be produced only in certain regions, are then joined up, and the sheet 29 can be removed except for the bend line regions, as indicated in FIG. 3 at 45, for a punching or stamping operation in the sheet punching or stamping machine. The bend line regions are then die portions for a sheet of cardboard 46 to be shaped.

As already stated, after the arrangement 44 has been adjusted or set up in the apparatus, the movable head 27 is operative to produce partial impressions or prints and in a so-called nylo-print setting-up operation, punched holes, which are required in a corresponding manner for the sheet punching or stamping machine, for precise positioning of register pins, which makes it possible for such nylo-print plates to be fixed outside the machine.

The head 27 is movable horizontally in two co-ordinate directions x and y, and can be actuated with a stroke movement in a vertical direction as indicated by z. Such movements of the head 27 may be controlled by a computer (not shown) which provides for actuation of a network or system of impression locations of the minimum number, thereby saving energy and time.

Figure 4:
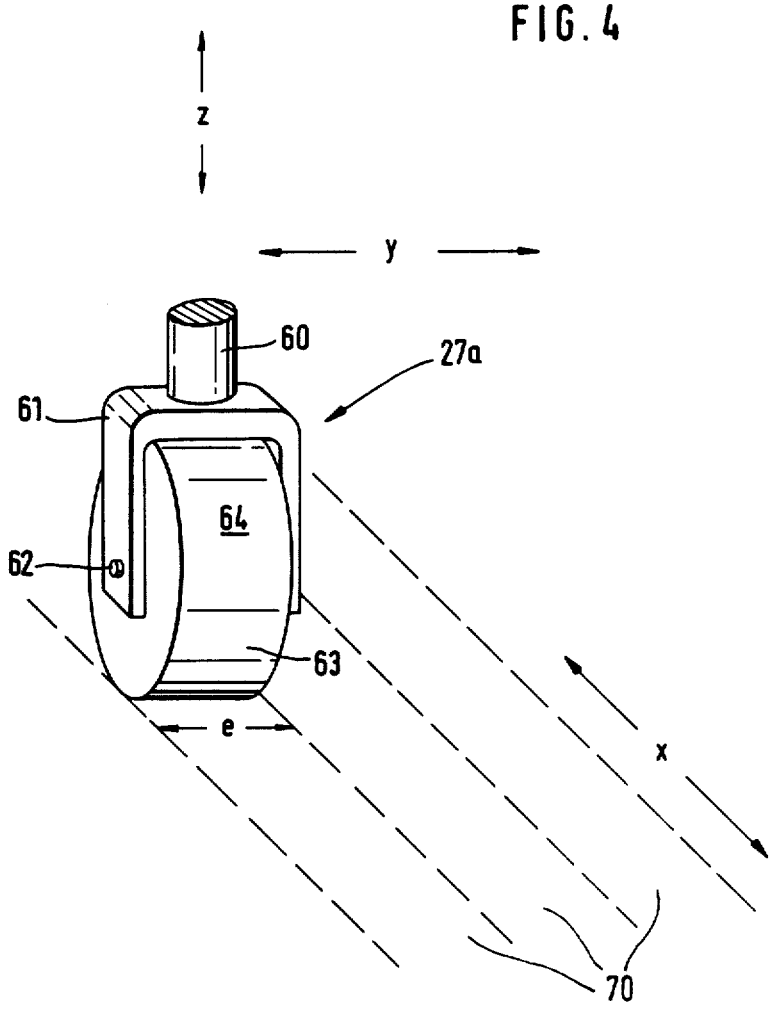
FIG. 4 shows a perspective view of a detail of the arrangement, on an enlarged scale.

FIG. 4 shows a particular modified embodiment 27a of the head member 27 on a stroke piston unit 60, which is movable in the direction indicated by arrow z in FIG. 1, and also in directions x and y, by means of the carriage 22 which is shown in FIG. 1. Mounted in a U-shaped fork mounting arrangement 61 connected to the operative portion of the unit 60, on a spindle or pin 62, is a pressing roller 63, the peripheral surface 64 of which performs the above-described function of the head 27; the roller can roll over a strip portion 70 which is of the same width e as the roller, in each rolling motion thereof. FIG. 4 shows that strips 70 may be partially pressured one beside the other.

Various other modifications and alterations may be made in the above-described constructions without thereby departing from the spirit and scope of the present invention, for example the apparatus may have more than one bridge assembly.

What is claimed is:

1. Apparatus for processing a sheet of material, comprising: a table plate adapted to receive a stamping plate for receiving a said sheet of material thereon; a stamping tool operatively associated with the stamping plate; a form means; tool holding means for releasably carrying the form means substantially parallel to the table plate; guide track means extending over the table plate at a spacing therefrom and disposed movably thereabove; carriage means carried on the guide track means and movable in a direction transverse with respect to the direction of movement of the guide track means; at least one vertically movable pressure member carried on the carriage means and operatively directed towards said table plate; and at least one lateral defining member which is arranged on the table plate in such a way as to be movable and fixable in a steplessly variable manner thereon wherein said lateral defining member carries holding means for said form means.

2. Apparatus as set forth in claim 1 wherein said pressure member comprises a roller having a peripheral surface thereby adapted to produce strip-like pressure regions.

3. Apparatus as set forth in claim 2 wherein said roller is rotatable about an axis in a vertically movable support means, and including an actuating means for vertically moving said support means.

4. Apparatus as set forth in claim 3 wherein said actuating means is a piston-cylinder unit.

5. Apparatus as set forth in claim 1 and further including an actuator means for displacing said carriage along said guide track means.

6. Apparatus as set forth in claim 1 and including a support structure providing side portions, wherein said lateral defining member is displaceable parallel to a said side portion which projects upwardly beyond the level of said table plate.

7. Apparatus as set forth in claim 6 wherein said lateral defining member is operatively connected to at least one guide spindle means rotatably disposed in said side portion, for producing movement of said lateral defining member.

8. Apparatus as set forth in claim 5 wherein said actuator means comprises an endless elongate actuating means, and an actuating wheel adapted to displace said elongate actuating means in a closed-loop movement, a portion of said carriage being connected to said elongate actuating mean for moving said carriage.

9. Apparatus as set forth in claim 1 and including a support structure providing side portions, wherein said guide track means is provided on a bridge assembly which extends over said table plate at a spacing therefrom and which is mounted on said side portions of said support structure at both ends of said bridge assembly.

10. Apparatus as set forth in claim 9 wherein said side portions provide elongate guide tracks, and wherein said bridge assembly is mounted on said guide tracks by means of rolling members.

11. Apparatus as set forth in claim 10 wherein said guide tracks comprise grooves formed in respective ones of said side portions and facing towards each other.

12. Apparatus as set forth in claim 11 wherein said bridge assembly comprises side plate assemblies carrying rollers engaging into said mutually facing grooves.

13. Apparatus as set forth in claim 9 wherein said bridge assembly comprises a beam member having a lower portion providing said guide track means for movably supporting said carriage.

14. Apparatus as set forth in claim 13 wherein said carriage is mounted on said guide track means by roller means.

15. Apparatus as set forth in claim 9 wherein said bridge assembly further comprises control means at respective ends thereof, operable to engage with control means on said side portions for guiding said bridge assembly in a condition of parallelism with respect to itself during movement thereof.

16. Apparatus as set forth in claim 9 wherein operation of at least one of said bridge assembly and said pressure member is computer-controlled.

17. Apparatus as set forth in claim 1 wherein said pressure member comprises a ram portion operable by a piston cylinder means operable in a direction towards said table plate.

* * * * *